No. 890,352. PATENTED JUNE 9, 1908.
I. M. FREDRICK.
POULTRY AND ANIMAL FEEDING DEVICE.
APPLICATION FILED MAY 22, 1907.

Witnesses
P. F. Nagle
L. Douville

Inventor
Isaac M. Fredrick
By Wiedersheim + Fairbanks
Attorneys

UNITED STATES PATENT OFFICE.

ISAAC M. FREDRICK, OF PERKASIE, PENNSYLVANIA.

POULTRY AND ANIMAL FEEDING DEVICE.

No. 890,352.  Specification of Letters Patent.  Patented June 9, 1908.

Application filed May 22, 1907. Serial No. 375,104.

*To all whom it may concern:*

Be it known that I, ISAAC M. FREDRICK, a citizen of the United States, residing at Perkasie, in the county of Bucks, State of Pennsylvania, have invented a new and useful Poultry and Animal Feeding Device, of which the following is a specification.

My invention consists of a device for automatically feeding poultry and animals in a predetermined quantity or time, the same embodying a feed receptacle, means for rotating said receptacle, and means for controlling the degree of speed of the same, so as to time the operation of the device.

Figure 1:
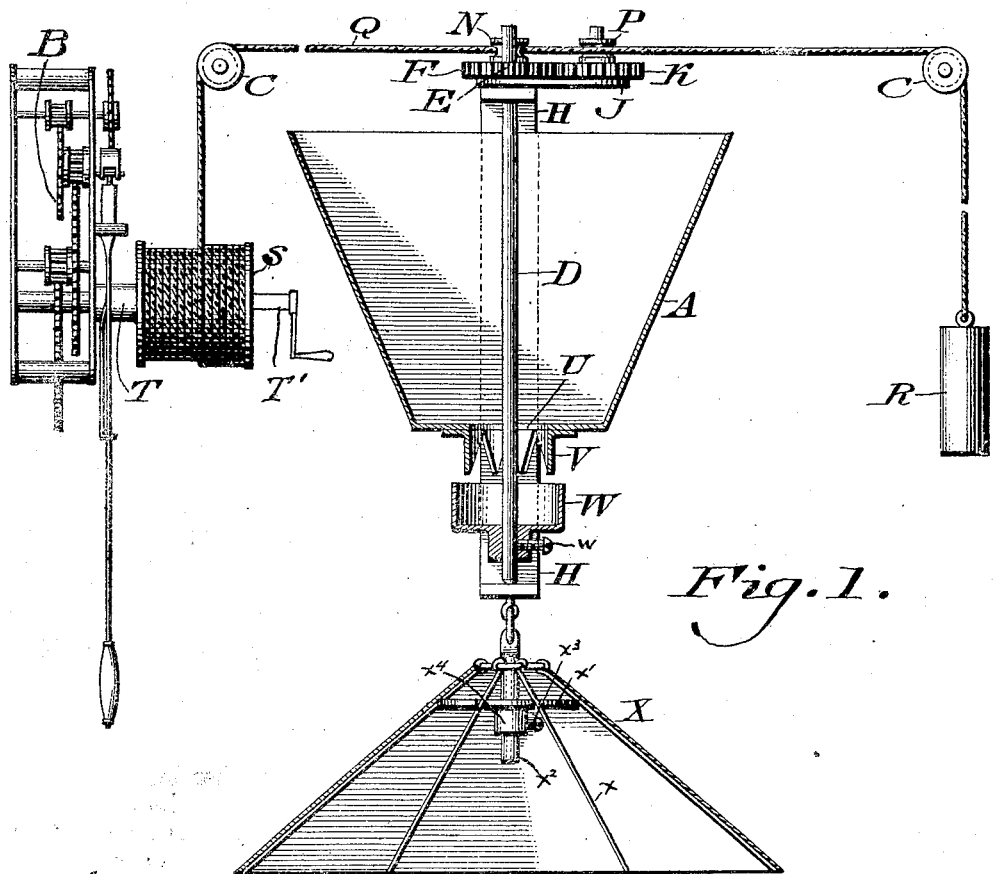
Figure 2:
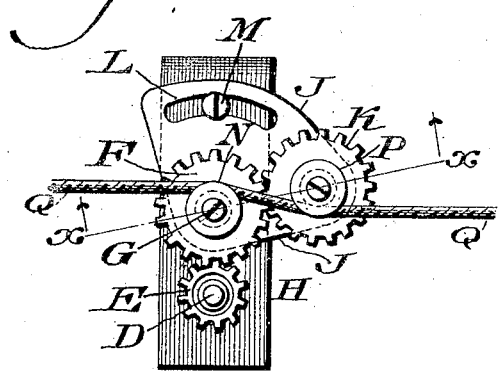
Figure 3:
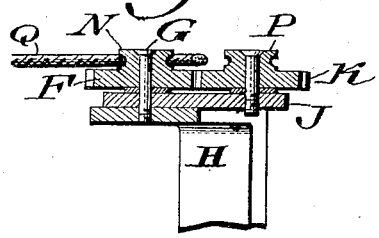

Figure 1 represents a partial side elevation and partial vertical section of a feeding device embodying my invention. Fig. 2 represents a plan view of a detached portion thereof. Fig. 3 represents a section on line $x$—$x$, Fig. 2.

Similar letters of reference indicate corresponding parts in the figures.

Referring to the drawings:—A designates a hopper or feed supplying box.

B designates a train of gearing after the manner of a clock, and C designates guide pulleys, which several parts are adapted to be suitably supported adjacent to a place where poultry or animals or both are to be fed.

D designates a vertically arranged shaft, which is mounted in the hopper A and has on its upper portion the pinion E, with which meshes the spur wheel F, whose shaft G has its bearing on a limb of an arm H, which is secured to the hopper A, said arm forming also the bearing for the upper portion of the shaft D.

J designates a segmental plate, which is mounted on the arm H by said shaft G, said plate having mounted thereon the spur wheel K, which is adapted to mesh with the spur wheel F, it being noticed that said plate is movable on said shaft G as a pivot, it being provided with a segmental slot L, through which passes the screw or stud M, which is fitted to the arm H, whereby when said screw is loosened, the plate may be turned to the right or left, and when in adjusted position, fastened by said screw M.

On the wheel F is the pulley N, and on the wheel K is the pulley P, each of which pulleys may be cast or otherwise formed with or secured to the respective wheel.

Q designates a cord or rope, which is passed over the guide pulleys C, gripped by said pulleys N, P, and has connected with the end below the same, the weight R, the other end thereof being adapted to be wound on the drum S, which is connected with an arbor T of the train of clock gearing or mechanism, it being noticed that the weight R tends to unwind the cord from said drum, while said train retards the unwinding and serves to control the same to an extent relatively to the amount of feed required to be discharged from the device, it being also noticed that the friction on the cord Q, due to the pulleys N and P, may be adjusted by the operation of the plate J upon its pivot to move it so that the line between the centers of the pulleys N and P will be more or less horizontal, whereby said pulleys may be moved to cause more or less deflection of the cord from a straight course, the effect of which will be to tighten and put a tension or friction on said cord, whereby the speed of rotation of the distributing member may be controlled.

In the bottom of the hopper A is a discharge opening U, depending from the same is the collar V, which forms a guide and guard, as will be hereinafter referred to. Below said collar V is the distributing pan W, which is adjustably secured to the lower end of the shaft D by means of the screw $w$, said end being stepped in the bottom limb of the arm H, from which latter depends the deflector X, which is of greater width than the pan W, the said deflector being composed of the pivotal ribs $x$, the member $x'$ on which said ribs are adapted to rest, the depending stem $x^2$ on which said member is vertically movable and the screw $x^3$ on the runner or sleeve $x^4$, said screw being adapted to engage said stem and hold the ribs in their adjusted position, as will be understood from Fig. 1, said deflector thus being adapted to be opened and closed, after the manner of an umbrella so as to spread the feed more or less as may be desired.

The operation is as follows:—The several adjustable parts are properly set, and feed placed in the hopper A, the cord Q being properly wound on the drum S by any suitable means as by a crank handle T' indicated by dotted lines in Fig. 1. The weight R now causes a draft on said cord, so as to unwind the same, the unwinding, however, being retarded and controlled by the train of clock gearing or mechanism, so that the cord will not run away. This clock mechanism forms a primary controlling device for the cord. The motion of the cord rotates the pulleys N, P, with which the same is in contact, and thus causes the operation of the shaft D and rotation of the pan W therewith. As the feed drops from the hopper through the outlet U, it is guarded from moving in lateral direction as it leaves said outlet and is guided to the pan W, which being open at top permits the feed to be centrifugally discharged thereat and distributed therefrom, when it falls upon the deflector X and rolls down the same to the place where the poultry and animals are to be fed, thus causing the feeding action to be uniform and predetermined as to the quantity and length of time desired.

While I have specified certain means for carrying out my improvements, I do not wish to be limited exactly to the same, but desire to make such changes as may come within the scope of the novelty involved.

Having thus described my invention, what I claim as new and desire to secure by Letters Patent, is:—

1. In an automatic feeding device of the character stated, a feed distributing member, a motor, gearing for rotating said member operatively connected with said motor, and means coöperating with said gearing for regulating the speed of said feed-distributing member.

2. In an automatic feeding device of the character stated, a feed distributing member, means for rotating the same, a motor operatively connected with said rotating means, and means coöperating with the rotating means for regulating the speed of rotation of said member.

3. An automatic feeding device of the character stated, comprising a feed distributing member, its shaft, a motor, gearing for rotating said shaft, a cord operatively connected with the motor for giving motion to said gearing, and means engaging said cord to regulate the speed with which said member rotates.

4. In an automatic feeding device of the character stated, a feed supply, a vertically disposed shaft, a feed distributing member in communication with the outlet of said supply, gearing for rotating said member and means adjustable on the shaft of said member for controlling its speed of rotation.

5. In an automatic feeding device of the character stated, a vertically disposed shaft, a feed supply, a horizontally disposed feed distributing member carried by said shaft in communication with the outlet of said supply, gearing for rotating said member, and means pivotally mounted on the shaft of said member for controlling the speed of said member.

6. In an automatic feeding device of the character stated, a feed supply, a feed distributing member in communication with the outlet of said supply, a shaft for rotating said member, gearing for said shaft, pulleys on said gearing, a movable cord engaging said pulleys, a motor for imparting motion to said cord, pivotal means carrying a portion of said gearing and pivotally mounted on the shaft of said member, and means carried by said pivotal means for regulating the speed of rotation of said member.

7. In an automatic feeding device of the character stated, a feed supply, a feed distributing member in communication with the outlet of said supply, a shaft for rotating said member, gearing for said shaft, a motor for said gearing, a movable flexible member extending from said motor and engaging said gearing and movable means carrying said gearing for deflecting said flexible member for adjusting the speed of said feed distributing member.

8. In an automatic feeding device of the character stated, a feed supply, a feed distributing member in communication with the outlet of said supply, a shaft for rotating said member, gearing for said shaft, pulleys on said gearing, a movable cord engaging said pulleys, means for imparting motion to said cord, and a movable bearing for one of said pulleys adjustably mounted on the shaft of said member, whereby it may be moved to change the positions of the pulleys relatively to the cord for adjusting the friction of said pulleys on said cord.

9. In an automatic feeding device of the character stated, a feed supply, a horizontally disposed centrifugal feed distributing member in communication with the outlet of said supply, means acting on the shaft of said member for rotating it, a guard and guide interposed between said supply and member and leading from one to the other, and a deflector beneath said member.

10. In an automatic feeding device of the character stated, a feed supply, a feed distributing member, and a foldable feed deflector below said member.

11. In an automatic feeding device of the character stated, a feed supply having an outlet at the bottom, a feed distributing member in communication with said outlet, a shaft connected with said member, a prime motor, and a flexible connection extending from said motor adapted to rotate said shaft, and a controlling device for said connection.

12. In an automatic feeding device of the character stated, a feed supply having an outlet at the bottom, a feed distributing member in communication with said outlet, a shaft connected with said member, a prime motor, a train of gearing, a flexible connection extending from said motor to a rotatable member of said train on which and from which said connection may be wound and unwound respectively, said connection being adapted to rotate said shaft, and a gripping device whereby the feeding mechanism is turned.

13. In an automatic feeding device of the character stated, a feed supply having an outlet at the bottom, a feed distributing member in communication with said outlet, a shaft connected with said member, a prime motor, a flexible connection extending from said motor adapted to rotate said shaft, a controlling device attached to said connection opposite to said motor, and means for adjusting the speed of said feed distributing member.

14. In an automatic feeding device of the character stated, a feed supply, a feed distributing member, a shaft carrying the latter, means for rotating said shaft, a feed deflector suspended below said member, and means for supporting said deflector.

15. In an automatic feeding device of the character stated, a feed supply, a feed distributing member disposed beneath the feed supply, means for positively rotating said distributing member, and an adjustable feed deflector below said member.

ISAAC M. FREDRICK.

Witnesses:
J. C. CORDERO,
DARWIN BENNER.